United States Patent
Buttolph et al.

(10) Patent No.: US 12,549,594 B2
(45) Date of Patent: *Feb. 10, 2026

(54) LIVENESS IN CONSENSUS PROTOCOL

(71) Applicant: Ava Labs, Inc., New York, NY (US)

(72) Inventors: Stephen John Buttolph, Brooklyn, NY (US); Kevin Sekniqi, Sunny Isles Beach, FL (US)

(73) Assignee: Ava Labs, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/206,573

(22) Filed: May 13, 2025

(65) Prior Publication Data

US 2025/0274486 A1 Aug. 28, 2025

Related U.S. Application Data

(63) Continuation of application No. 18/603,926, filed on Mar. 13, 2024, now Pat. No. 12,335,304.

(60) Provisional application No. 63/490,153, filed on Mar. 14, 2023.

(51) Int. Cl.
*H04L 9/40* (2022.01)
*H04L 9/00* (2022.01)

(52) U.S. Cl.
CPC ............ *H04L 63/1441* (2013.01); *H04L 9/50* (2022.05)

(58) Field of Classification Search
None
See application file for complete search history.

(56) References Cited

U.S. PATENT DOCUMENTS

| | | |
|---|---|---|
| 2019/0020729 A1 | 1/2019 | Chen et al. |
| 2019/0235946 A1* | 8/2019 | Guo ................... H04L 67/1097 |
| 2020/0396065 A1 | 12/2020 | Gutierrez-Sheris |
| 2021/0026745 A1* | 1/2021 | Wang ................... G06F 11/183 |

(Continued)

OTHER PUBLICATIONS

Ren, S., Lee, C., Kim, E. and Helal, S., 2022. Flexico: An efficient dual-mode consensus protocol for blockchain networks. Plos one, 17(11), p. e0277092. (Year: 2022).*

(Continued)

*Primary Examiner* — Luu T Pham
*Assistant Examiner* — Edward X Long
(74) *Attorney, Agent, or Firm* — McDermott Will & Schulte LLP

(57) ABSTRACT

Various aspects of the subject technology relate to systems, methods, and machine-readable media for enhancing liveness in a blockchain. Various aspects may include running a first consensus protocol. Aspects may also include detecting a liveness attack in the first consensus protocol. Aspects may also include suspending, when the liveness attack is detected, acceptance of new blocks in the first consensus protocol. Aspects may also include broadcasting a preferred block and identifying a highest accepted block in the set of nodes from running the first consensus protocol based on the preferred block. Aspects may also include transitioning from the first consensus protocol to the second consensus protocol and running the second consensus protocol until a consensus value or a new accepted block is decided. Aspects may also include reinstating and resuming running the first consensus protocol based on the new accepted block.

18 Claims, 5 Drawing Sheets

(56) References Cited

U.S. PATENT DOCUMENTS

2022/0083656 A1* 3/2022 Park .................... G06F 16/2379
2023/0017231 A1* 1/2023 Ozga .................... H04L 9/3242

OTHER PUBLICATIONS

Altarawneh, A., 2021. Liveness analysis, modeling, and simulation of blockchain consensus algorithms' ability to tolerate malicious miners. (Year: 2021).*

Cachin, C. and Vukolić, M., 2017. Blockchain consensus protocols in the wild. arXiv preprint arXiv:1707.01873. (Year: 2017).*

Abraham, I., et al. "Asymptotically optimal validated asynchronous byzantine agreement." In Proceedings of the 2019 ACM Symposium on Principles of Distributed Computing, pp. 337-346. 2019.

International Search Report and Written Opinion for International Patent App. No. PCT/US2024/019802, mailed Jun. 26, 2024 (14 pages).

Lewis-Pye, A., et al. "Permissionless Consensus." arXiv preprint arXiv:2304.14701 (2023).

Ren S, Lee C, Kim E, Helal S (2022) Flexico: An efficient dual-mode consensus protocol for blockchain networks. PLoS ONE 17(11): e0277092. https://doi.org/10.1371/journal.pone.0277092 (Year: 2022).

Team Rocket, et al. "Scalable and probabilistic leaderless BFT consensus through metastability." arXiv preprint arXiv:1906.08936 (2019).

* cited by examiner

LIVENESS IN CONSENSUS PROTOCOL

CROSS-REFERENCE TO RELATED APPLICATIONS

This application claims priority under 35 U.S.C. § 120 as a continuation of U.S. patent application Ser. No. 18/603,926, filed Mar. 13, 2024, which claims the benefit of U.S. Provisional Patent Application No. 63/490,153, to Buttolph et al., filed on Mar. 14, 2023, the disclosures of all of these applications and patents are incorporated by reference herein.

TECHNICAL FIELD

The present disclosure generally relates to a transition protocol for a blockchain implementation. More specifically, the present disclosure relates to methods for transitioning between consensus protocols of a blockchain when liveness of a consensus protocol is endangered.

BACKGROUND

A blockchain is a database that maintains records for transactions and tracking of assets in blocks. A blockchain network includes nodes such as a validator node that participates in consensus. Validator nodes are capable of verifying, voting on, staking and/or maintaining a record of transactions for the blockchain network as well as storing a copy of the blockchain. Validators are also responsible for producing and/or proposing blocks for addition to the blockchain network. Validators can participate in a consensus voting protocol for implementation of blockchain deployments or building on subnets. Factors such as liveness and safety of consensus mechanisms of blockchain networks may be considered and valued differently depending on the blockchain. Liveness of a consensus mechanism represents the guarantee that a protocol can exchange messages between nodes of a blockchain network, allowing the nodes to eventually come to a consensus. The safety of a consensus mechanism represents the guarantee that a consensus or value between nodes is consistent across the nodes of the blockchain network.

BRIEF SUMMARY

The subject disclosure provides for systems and methods for enhancing liveness in a blockchain network running consensus protocols by implementing transition protocols. In an aspect, an existing consensus protocol may have guaranteed safety, but liveness may be attacked at some point. As such, embodiments enable seamless transitioning between the existing consensus protocol and fallback high safety-high liveness protocol. According to aspects, once liveness is restored, the system switches back to the initial protocol until another liveness attack is detected.

According to embodiments, a computer-implemented method for transitioning in consensus protocols is provided. The method includes running a first consensus protocol in a set of nodes of a blockchain network. The method includes detecting a liveness attack in the first consensus protocol at a node in the set of nodes. The method includes suspending, when the liveness attack is detected, acceptance of new blocks in the first consensus protocol. The method includes identifying a highest accepted block in the set of nodes from running the first consensus protocol. The method includes setting an initial preference for a second consensus protocol to the highest accepted block. The method includes transitioning to the second consensus protocol. The method includes determining a consensus value of a new accepted block based on running the second consensus protocol in the set of nodes.

According to embodiments, a system is provided including a processor and a memory comprising instructions stored thereon, which when executed by the processor, cause the processor to perform a method for implementing transition protocols. The method includes running a first consensus protocol in a set of nodes of a blockchain network. The method also includes detecting a liveness attack in the first consensus protocol at a node in the set of nodes. The method also includes suspending, when the liveness attack is detected, acceptance of new blocks in the first consensus protocol. The method also includes identifying, based on a preferred block, a highest accepted block in the set of nodes from running the first consensus protocol. The method also includes setting an initial preference for a second consensus protocol to the highest accepted block. The method also includes transitioning from the first consensus protocol to the second consensus protocol. The method also includes determining a consensus value of a new accepted block based on running the second consensus protocol in the set of nodes.

According to embodiments, a non-transitory computer-readable storage medium is provided including instructions (e.g., stored sequences of instructions) that, when executed by a processor, cause the processor to perform a method for implementing transition protocols. The method includes running a first consensus protocol in a set of nodes of a blockchain network. The method also includes detecting a liveness attack in the first consensus protocol at a node in the set of nodes. The method also includes suspending, when the liveness attack is detected, acceptance of new blocks in the first consensus protocol. The method also includes identifying, based on a preferred block, a highest accepted block in the set of nodes from running the first consensus protocol. The method also includes setting an initial preference for a second consensus protocol to the highest accepted block. The method also includes transitioning from the first consensus protocol to the second consensus protocol, wherein the second consensus protocol is run until a new accepted block is finalized. The method also includes reinstating the first consensus protocol based on the new accepted block being finalized, wherein the first consensus protocol is reinstated on top of the new accepted block.

According to embodiments, a computer-implemented method for transitioning in consensus protocols is provided. The method may include a means for running a first consensus protocol in a set of nodes of a blockchain network. The method may include a means for detecting a liveness attack in the first consensus protocol at a node in the set of nodes. The method may include a means for suspending, when the liveness attack is detected, acceptance of new blocks in the first consensus protocol. The method may include a means for identifying a highest accepted block in the set of nodes from running the first consensus protocol. The method may include a means for setting an initial preference for a second consensus protocol to the highest accepted block. The method may include a means for transitioning to the second consensus protocol. The method may include a means for determining a consensus value of a new accepted block based on running the second consensus protocol in the set of nodes.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
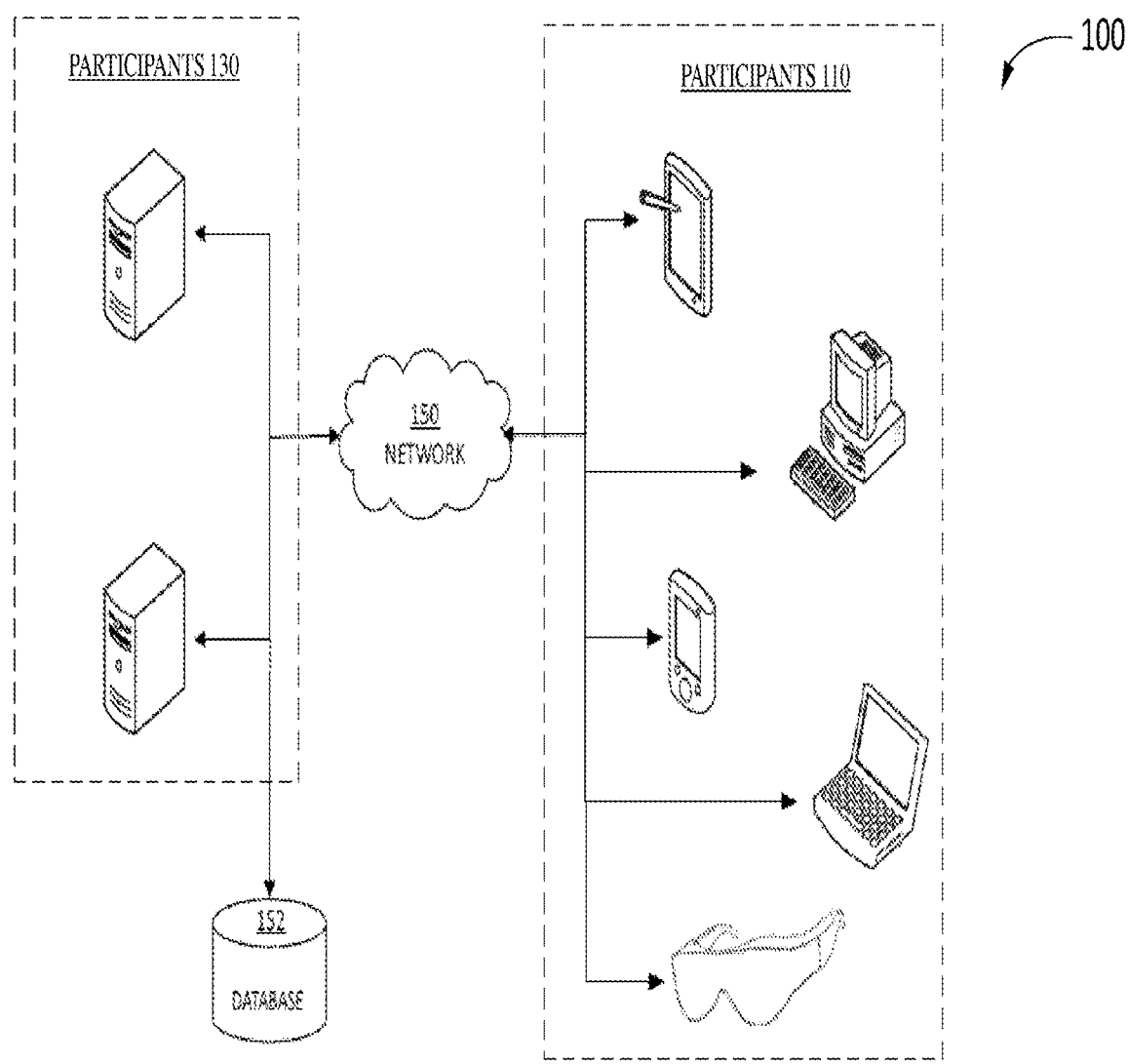
FIG. 1 is a block diagram of a device operating environment with which aspects of the present disclosure can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

General Overview

Blockchain platforms, such as for smart contracts, may require a consensus protocol as a fundamental building block for building distributed systems. As an example, a blockchain platform can include multiple blockchains, such as a component exchange blockchain for creating and trading digital smart assets, a metadata blockchain for coordinating validators as well as tracking and creating subnets, and a contract blockchain for creating smart contracts. As used herein, a subnet or subnetwork includes a dynamic set of nodes (e.g., one or more validators) seeking to achieve consensus on a state of a set of blockchains such that one blockchain is validated by one subnet although one subnet can validate multiple blockchains. A node can participate in the validation of multiple subnets and can be subject to requirements of the blockchains within those subnets, such as for security, licensing, hardware and/or the like. Blockchains being validated by validators may be of a blockchain network (or platform) with application-level logic defined by multiple virtual machines (VMs) which enable more decentralized networks. In particular, a blockchain may be an instance of a VM that specifies the blockchain's state, state transition function, transactions, and application programming interface (API) for user interaction. The VM allows for the execution of smart contracts and decentralized applications on the blockchain, providing a secure and deterministic environment for code execution and enabling interoperability between blockchains or cross-chain communication.

The consensus protocol can be used to coordinate blockchains on the blockchain platform. For example, the consensus protocol can be used for the metadata blockchain and/or the contract blockchain for building consensus for validators such as for custom subnets, execution of smart contracts, etc. Nodes of the network may cast votes to agree on transactions, validate blocks, or make key network decisions. Determining the consensus among participants may include polling, sampling, or subsampling votes to ensure agreement on the order of transactions within the blockchain network. There is generally a trade-off between the liveness and safety of a consensus protocol. Liveness refers to the guarantee that a protocol can exchange messages between network nodes, enabling them to reach an agreement or consensus. Liveness ensures that the system continues to make progress and that transactions are processed within a reasonable time frame. Safety refers to the assurance that nothing incorrect occurs within the system and an agreement will be reached across nodes. That is, if transactions are deemed final by one properly operating node, it will eventually be considered final by all properly operating nodes. Safety is crucial for maintaining the integrity and correctness of the blockchain network, ensuring that all nodes agree on transactions. Consensus protocols that always maintain high safety and high liveness are not able to maintain efficient verification with a large number of members in the system, and thus are not favorable due to their lack of applicability.

The subject disclosure overcomes the above-described shortcomings by providing a transition mechanism that enables transition between consensus protocols that prioritize liveness over safety and/or safety over liveness. The transition mechanism may leverage an existing high safety-high liveness consensus protocol and view changes to enhance liveness in consensus protocols. According to aspects of embodiments, the transition mechanism may implement a quorum-based asynchronous (randomized)

Byzantine Fault Tolerance (BFT) protocol that achieves multi-value consensus as a fallback consensus mechanism in the event that liveness is endangered. According to aspects of embodiments, in the event of a liveness attack, the transition mechanism enables a temporary switch from a high safety-low liveness consensus protocol into a high safety-high liveness consensus protocol to finalize a next block. Once this is achieved, the blockchain network is reverted to implementing the high safety-low liveness consensus protocol. This may be continuously applied whenever liveness is threated in the network, boosting liveness when under byzantine adversaries that behave in a deceitful or faulty manner to disrupt the consensus process.

According to aspects of embodiments, the transition mechanism may be asynchronous in its operational logic, which results in a more robust transitioning. The transition mechanism facilitates the transition between a first consensus protocol and a second consensus protocol when liveness is endangered, and further reverts back to the first consensus protocol when liveness is no longer endangered (e.g., the next block is finalized). In a given instance of processing, the network may be running the first consensus protocol or the quorum-based protocol (hereafter referred to as the "second consensus protocol"). The second consensus protocol is only initiated if there is a liveness attack during a previous instance, forcing a transition from the first to the second consensus protocol.

According to aspects of embodiments, the first consensus protocol may be a fast consensus mechanism with strong safety guarantees (with low communication overhead) and the second consensus protocol may be a slower fallback mechanism (e.g., relative to the first consensus protocol) having strong liveness guarantees as well as safety guarantees. Instructions of the overall consensus may be divided into epochs representing protocol instances of the network. Assuming the network starts with the first consensus protocol that guarantees safety (i.e., epoch 0), when consensus or acceptance a transaction is not making progress, the polling process of network participants and acceptance of new blocks are stopped. By non-limiting example, lack of progress in consensus may be a result of a decision not being reached fast enough, adversaries sending conflicting information, delay message delivery, or an attempt to undermine the integrity of the network. In some aspects, a liveness counter is implemented to track a duration of the polling process. Stopping the polling process freezes the state of the consensus instances across the network. When the state is frozen, the state of each node's frozen consensus instance is identified and fed into the second consensus protocol. In this manner, the network transitions to the fallback or second consensus protocol with higher liveness (i.e., epoch 1).

Upon transitioning to the second consensus protocol, the second consensus protocol decides on a new value based on safety/liveness parameters of the protocol. After the new value is decided, the first consensus protocol is restarted (i.e., epoch 2) with the updated newest accepted decision. This processing continues triggering the transition to the fallback consensus protocol whenever liveness is endangered and reverting to the original consensus protocol when a decision is made using the fallback. In some implementations, the transition mechanism is initiated periodically during normal operation (i.e., even when liveness is intact in the system).

According to aspects of embodiments, feeding in a state from a previous consensus instance allows a current consensus instance to be able to maintain the safety property, for example, even in a case where a node finalizes a value during the freezing process. Taking local values of a consensus instance and then using those values when entering a subsequent consensus instance allows the system to extract a chain that is safe for the second consensus protocol to build on. As such, the safety guarantee remains, and thus the new value decided in a current instance will not be a conflicting value with the preceding instance.

The disclosed system addresses a problem in traditional blockchains rooted in computer technology, namely, the technical problem of maintaining and further boosting liveness of a consensus protocol implementing a transition mechanism. The disclosed system solves this technical problem by providing a solution also rooted in computer technology, namely, by providing systems and methods that force consensus protocol transitions when liveness is endangered. The disclosed system can easily detect the cause of a loss in liveness based on the transition between protocols and remedy that issue in a next instance of the processing. The disclosed system also improves the functioning of the computer itself because it reduces performance requirements and communication overhead while maintaining high security and enhancing liveness by guarantees that the system can still advance and make decisions. Further, the asynchronous fallback protocol makes the process robust in nature. Even further, by combining aspects of the first and second consensus protocols via the transition between consensus protocols, embodiments provide a consensus mechanism with strong safety and liveness properties while being fast (or maintaining speed).

As used herein, the term "blockchain" generally refers to an open and distributed public ledger comprising a growing list of records, which are linked using cryptography. By design, the blockchain is resistant to modification of the data. The blockchain can include an auditable database that provides a distributed, replicated ledger of cryptographically certified artifacts whose contents are extremely difficult to tamper with without detection, and therefore, are with very high probability, true copies of the intended content, and whose content are open for inspection via a suitable query interface.

As used herein, the term "block" generally refers to a record that is kept in a blockchain. For example, each block contains a cryptographic hash of the previous block, a timestamp, and transaction data, which can generally be represented as a Merkle tree root hash.

As used herein, the term "subnet" or "subnetwork" generally refers to a dynamic set of validators working together to achieve consensus on a state of a set of blockchains. For example, each blockchain is validated by exactly one subnet. A subnet can validate arbitrarily many blockchains. A validator node may be a member of arbitrarily many subnets. A subnet may manage its own membership and it may require that its constituent validators have certain properties.

As used herein, the term "primary network" generally refers to a special subnet, which validates built-in blockchains. Members of the subnets may also be a member of the primary network. In some embodiments, a subject that is member of the primary network, stakes (e.g., acquires or "buys") one or more tokens from the primary network. As a result, blockchain validators can validate built-in blockchains on the primary network and have also staked primary network tokens.

In some embodiments, a customized blockchain may include a VM marketplace having subnets serviced by unique VM modules that allow users to create feature sets directed to specific needs. For example, a gaming application in the VM marketplace will have different VM modules than a finance application.

Example Architecture

FIG. 1 illustrates a network architecture 100 to provide a blockchain platform (e.g., blockchain network implementation/deployment platform) for managing consensus protocols. The network architecture 100 of FIG. 1 includes one or more participants 110 and one or more participants 130 which are communicatively coupled via a network 150. The blockchain architecture of the network architecture 100 can be a distributed database that maintains a continuously growing list of ordered records as the blocks. The blockchain architecture may host applications bridging subnets and handle their assets and transactions over multiple blockchains, running in participants 110 and/or participants 130. Participants 110 and/or participants 130 may be used by users and administrators of the blockchains. This includes contributors to a blockchain, transaction validators, miners, parties to a smart contract, and the like. The blockchain architecture may implement a transition mechanism, switching between running consensus protocols in the blockchain based on protocol parameters and liveness of the protocol. The transition mechanism is designed to facilitate seamless transitions to ensure the safety and liveness of a system, allowing a chain to reach a decision quickly by enhancing the liveness of a high safety protocol through the transition.

It is understood that the participants 130 may include the participants 110 as well, such that they are peers. As an example, the participants 130 may include a cloud server or a group of cloud servers. In some implementations, the servers may not be cloud-based (i.e., may be implemented outside of a cloud computing environment) or may be partially cloud-based. The participants 110 include one or more desktop computers or panels mounted on racks, and/or the like. The participants 110 may be any one of a mobile device, a laptop, a desktop, a tablet (e.g., palm or pad) device, a television, a display device, and/or the like. The participants 110 can be controlled by users as a set of validator nodes for making decisions in tandem, such as for facilitating operation or design of the blockchain implementations of the blockchain platform. As an example, the participants 110 may be clients of the blockchain platform for creating, expanding, or otherwise modifying customized blockchain networks and/or private or public subnets. As an example, the participants 110 can function as validators or virtual machines (VMs) that form nodes of the blockchain network architecture 100. The participants 110 that function as nodes can run software to verify block and transaction data, store data, validate, respond to network requests for data, and/or the like for the existing blockchain. VMs can be computers that run on blockchain and allow smart contracts from multiple sources to interact with one another. By non-limiting example, participants 110 can send messages or issue transactions upon request by the participants 130, such as via a module of the participants 130 at a particular time such as during a specified temporal submission window. The blocks being generated and proposed for addition to the existing blockchain may be validated as being a valid block before its addition.

Network 150 may include a wired network (e.g., via fiber optic or copper wire, telephone lines, and the like) or wireless network (e.g., a cellular network, radio-frequency (RF) network, Wi-Fi, Bluetooth, and the like). The network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like. Multiple participants 110 may have access to the blockchain platform hosted by the participants 130 via the network 150 in an online or offline connection, such as a wireless connection, wired connection, ad hoc connection, mobile connection, satellite connection, and/or the like.

As discussed herein, the blockchain network architecture 100 can incorporate application of a consensus protocol that is high throughput, totally-ordered, and effective for smart contracts. Smart contracts may refer to self-executing computer programs, applications, or contracts for executing transactions such as financial transactions involving cryptocurrency. The blockchain network architecture 100 may be used for creation of custom blockchains (including private blockchains) and decentralized applications (dApps). The consensus protocol may be run to reach an agreement on user transactions, adding blocks to the existing blockchain, interaction with external resources (e.g., off-chain), etc. The consensus protocol implemented by the blockchain network architecture 100 may be a de-centralized, leaderless block proposal mechanism that handles multiple valid block proposals concurrently and limits the submission of proposals for the existing blockchain. As an example, the blockchain network architecture 100 may use repeated subsample voting and validators may provide strong probabilistic guarantees of correctness (e.g., safety and liveness) without communicating with other validators.

The participants 130 may store data of the existing blockchain in a peer-to-peer (P2P) and/or distributed ledger fashion in a database 152. The database 152 may store relevant information regarding, for example, execution, and verification logic and/or rules for implementing consensus protocols, etc. Database 152 may store backup files from blockchain transactions, smart contracts, signatures, and digital assets including tokens, cryptocurrencies, smart contracts, encryption keys, signature keys, and financial data. Participants 130 may function in conjunction to autonomously manage the decentralized database(s) of the existing blockchain via the P2P network and a distributed timestamping server of the participants 130. The participants 130 may be configured to implement multiple chains of the blockchain network architecture 100. For example, the participants 130 can implement a plurality of chains of the blockchain network architecture 100, such as an asset blockchain (e.g., for creating new assets, asset exchange, cross-subnet transfers), metadata blockchain (e.g., for coordinating validators, tracking active subnets, and creating new subnets), smart contract blockchain (e.g., for creating smart contracts and applications that require total ordering), etc. The plurality of chains can be validated by a primary network of the blockchain network architecture 100 that comprises all existing subnets.

Generally, participant 110 and participant 130 include computing devices (e.g., computing platform 302 described later in FIG. 3) including at least: the memories storing instructions and processors configured to execute the instructions to perform, at least partially, one or more execute applications, functions, steps and/or operations according to embodiments described according to one or more embodiments. The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s). For example, a memory of the participant 110 may be used to perform functions associated with the blockchain platform hosted by the participant 130. The processors may be used to operate the participant 110, such as to execute applications and functions thereof rendered on at least one of the participants 110 and participants 130.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 2:
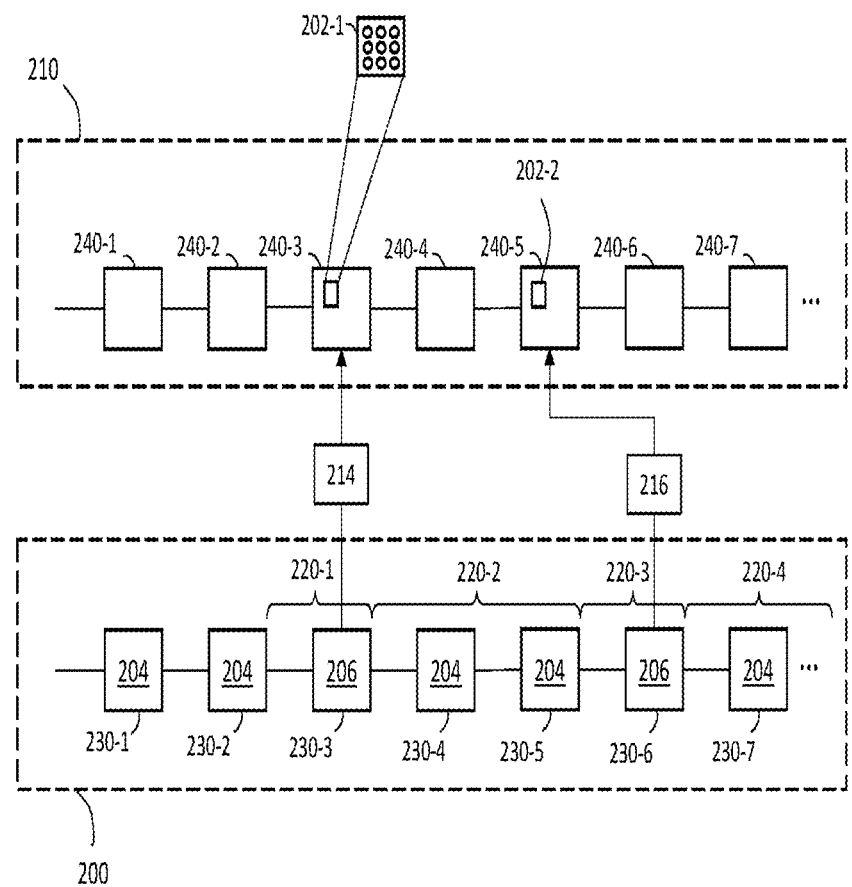
FIG. 2 is a block diagram of consensus protocols implementing a transition mechanism in a blockchain platform/network, according to certain aspects of the present disclosure.

FIG. 2 illustrates an exemplary consensus protocol 200 implementing a transition mechanism in a blockchain platform/network, according to certain aspects of embodiments. The consensus protocol 200 may include subprotocols: first consensus protocol and second consensus protocol. Operations described herein with reference to FIG. 2 may be performed by one or more processors, in accordance with one or more embodiments.

According to embodiments, the blockchain platform includes a custom chain 210 (e.g., P-chain) comprising a shared registry. The custom chain may be included in a primary network of the blockchain platform. The shared registry defines which nodes belong to which underlying chains or subnets (i.e., which nodes validate which one or more subnets/chains). Nodes may include, by non-limiting example, validators configured to validate a block and/or proposers configured to propose a block to the custom chain, or the like. In some implementations, the transition mechanism requires nodes to know which node sets are responsible for validating a given component. As such, the shared registry may be leveraged to make sure node sets in the blockchain platform are well-defined and consistent across all participants of the consensus protocol 200.

Nodes 230-1, 230-2, 230-3, 230-4, 230-5, 230-6, and 230-7 (hereafter, collectively referred to as "nodes 230") across the network must agree on a block of chain 210 (e.g., chain block 240-1, 240-2, 240-3, 240-4, 240-5, 240-6, and 240-7 (hereafter, collectively referred to as "chain blocks 240")). Given a chosen height for a block on the chain 210, membership of nodes can be determined by staking sets (e.g., staking set 202-1 and staking set 202-2 (hereafter referred to as "staking sets 202")).

To have a globally consistent choice of the chain blocks 240, ensuring all nodes agree upon a chain block, accepted blocks (proposed by the second consensus protocol 206) include an extra field for height in the chain 210. Embedding a chain 210 height as part of the accepted block will ensure it is a consistent choice as of the block on the first consensus protocol 204 chain.

In some embodiments, due to asynchrony of protocols, nodes may start the transition from a different height of the first consensus protocol 204 process. To synchronize the view, each block proposed by the second consensus protocol 206 exactly captures an instance (i.e., a transition from first to second consensus protocols) in history. As such, each proposed block (and more specifically, the value proposed in the accepted block decided by running the second consensus protocol 206) can be used to point to a corresponding block of chain blocks 240. Each proposed block can also be used to count the number of past proposed blocks as the identifier for a run of the second consensus protocol 206 (e.g., instance 220-1 and instance 220-3). For example, accepted block 214 decided at node 230-3 points to its corresponding chain block 240-3. The corresponding chain block 240-3 is determined based on a chain height value embedded in the accepted block 214. Similarly, accepted block 216 decided at node 230-6 points to its corresponding chain block 240-5. The corresponding chain block 240-5 is determined based on a chain height value embedded in the accepted block 216.

In some embodiments, multiple second consensus protocol runs may happen concurrently in the network, due to asynchrony, and use the staking sets 202 from the chain blocks 240 pointed by the most recent accepted block that comes before the second consensus protocol. That is, the number of accepted blocks (e.g., accepted block 214 and/or accepted block 216) that comes before (i.e., ancestry) a current accepted block B can be used to identify the second consensus protocol run that decides the current accepted block B.

In some embodiments, the blockchain platform includes a counter tracking the number of past accepted blocks. The counter may be used as an identifier for transition mechanism runs (i.e., cycles) in the platform. For example, if id represents a transition instance (or epoch) when running the consensus protocols 200, and id (B) represents the number of accepted blocks that come before a current accepted block B, the number id (B) is also the transition instance id that decides the current accepted block B. Each id uniquely identifies an instance (e.g., of instances 220). In some implementations, when an instance is called on based on a given id and does not exist, a new instance may be created for the given id, with empty execution context.

As shown in FIG. 2, instances of the transition mechanism include, but are not limited to, instances 220-1, 220-2, 220-3, and 220-4 (hereafter, collectively referred to as "instances 220"). All instances are a standalone process of the overall consensus protocol 200 with its own specified execution context. A given instance may run at least one of a first consensus protocol or a second consensus protocol to make a decision regarding a transaction in the blockchain. A set of nodes may be queried, in one or more rounds (e.g., at nodes 230) of processing consensus protocol 200, to decide on a new accepted block. By non-limiting example, to finalize a new block in the event of liveness failure, instances of the consensus protocol 200 transition from the first consensus protocol 204 to the second consensus protocol 206.

According to embodiments, for each of the instances 220, chain blocks 240 include staking sets (e.g., staking sets 202). The staking sets may include the set of all nodes in the network. For example, for a current instance id, the set of nodes N may be the staking set determined by an accepted chain 210 block at the height indicated in the current accepted block B decided in a current second consensus protocol run (i.e., id−1). A current accepted block can use the staking set from the chain block 240 pointed by the most recent accepted block that comes before the current second consensus protocol run to choose a chain block.

Initially (i.e., epoch 0), the set of nodes may be queried for one or more values according to the first consensus protocol 204. In some embodiments, in response to the queries, each node reports their final value (i.e., an accepted block) as well as a preferred value (i.e., a preferred block). The preferred block refers to a block that has been validated by a node in the set of nodes. In some implementations, one or more nodes of the set of nodes may start to accept the preferred block depending on the number of nodes prefer the block. As the most recent accepted block in a preferred chain of blocks, a preferred block can describe a preference chain. If the final value decided at node 230-1 remains unchanged (e.g., nodes in the set of nodes agree and finalize a value), a message may be sent to all other nodes in the network indicating node 230-1 wishes to proceed to the next epoch and continue running the first consensus protocol 204. The message may be signed using a signature key each associated with node 230-1. In some embodiments, before node 230-2 enters the consensus protocol, at least a threshold number of nodes (in the set of nodes) must also broadcast a message indicating they agree with the decision to continue running the first consensus protocol 204. In the example of FIG. 2, during a first round of processing, the final value in node 230-1 remains unchanged and, as such, node 230-2 continues to run the first consensus protocol 204 in the next round.

Node 230-2 running the first consensus protocol 204 encounters a liveness failure, the protocol is frozen (i.e., stops further polling) and a preferred block is broadcasted to the network. The preferred block is used to determine a highest acceptable block a node in the set of nodes could have committed. All blocks accepted prior to the highest acceptable block are considered safe values and any can be selected arbitrarily as the preferred block (or to represent the preferred block). The transition is then made from the first consensus protocol 204 to the second consensus protocol 206 and the instance 220-1 is initiated for running the second consensus protocol 206 in a subsequent round of processing at node 230-3. The preferred block identified from node 230-2 is used as the initial block (i.e., block 0) for processing in instance 220-1 when running the second consensus protocol 206. In further processing, the preferred block identified in a previous instance is used as the initial block of new epoch or round, serving as the starting point for all subsequent blocks, in the initiated instance. For example, a preferred block identified based on node 230-5 in instance 220-2 is used as the initial block for running (at instance 220-3) the second consensus protocol 206 in node 230-6.

The second consensus protocol 206 runs and decides on accepted block 214 based on the initial block. The accepted block 214 is an accepted and finalized block of the instance 220-1. The message is broadcast to the network when the accepted block 214 is decided. The extra field for height in the chain 210 embedded in the accepted block 214 is used to verify that the agreed upon chain block 240-3 is consistent. If consistent, the first consensus protocol 204 is reinstated and the consensus protocol 200 moves into the next instance (i.e., instance 220-2) on top of the newly accepted block 214. Running the first consensus protocol 204 in a new instance (with a new unique ID) avoids conflicting with any prior transitions in the consensus protocol 200. Similarly, for example, instance 220-2 running the first consensus protocol 204 encounters a liveness failure. The transition is made from the first consensus protocol 204 to the second consensus protocol 206, switching into instance 220-3. The second consensus protocol 206 decides on an accepted block 216 using a preferred block from node 230-5 in instance 220-2. The accepted block 216 is broadcasted to the network and the height embedded in the accepted block 214 is used to verify that the agreed upon chain block 240-5 is consistent. At which point, the first consensus protocol 204 is reinstated at instance 220-4 and run at node 230-7 on top of accepted block 216.

According to embodiments, during the running of the second consensus protocol 206 in any instance, a correct node will choose the height of the latest known block of chain blocks 240 for its proposal. The chain blocks 240 height number is in a valid accepted block (e.g., accepted block 214 and accepted block 216) and must be greater than an ancestor (preceding) accepted block.

In some embodiments, the consensus protocol 200 implements leader-based consensus protocols. The consensus protocols may randomly select a leader. Leaders are nodes or entities responsible for initiating and coordinating the consensus process, proposing new blocks, validating transactions, and ensuring agreement among network participants. Leaders may also be responsible for maintaining network integrity, managing communication among nodes, and driving the decision-making process within the network. The leader node broadcasts its decision regarding a proposed value (block) to the network to enable other nodes to validate and agree on the proposed block. In some implementations, a current leader may fail to decide resulting in liveness failure. To ensure progress and advancement of the consensus mechanism within the network, the failed leader times out and a view change is implemented to reselect a new leader. According to embodiments, the view change includes invoking the transition between the one or more consensus protocols.

Figure 3:
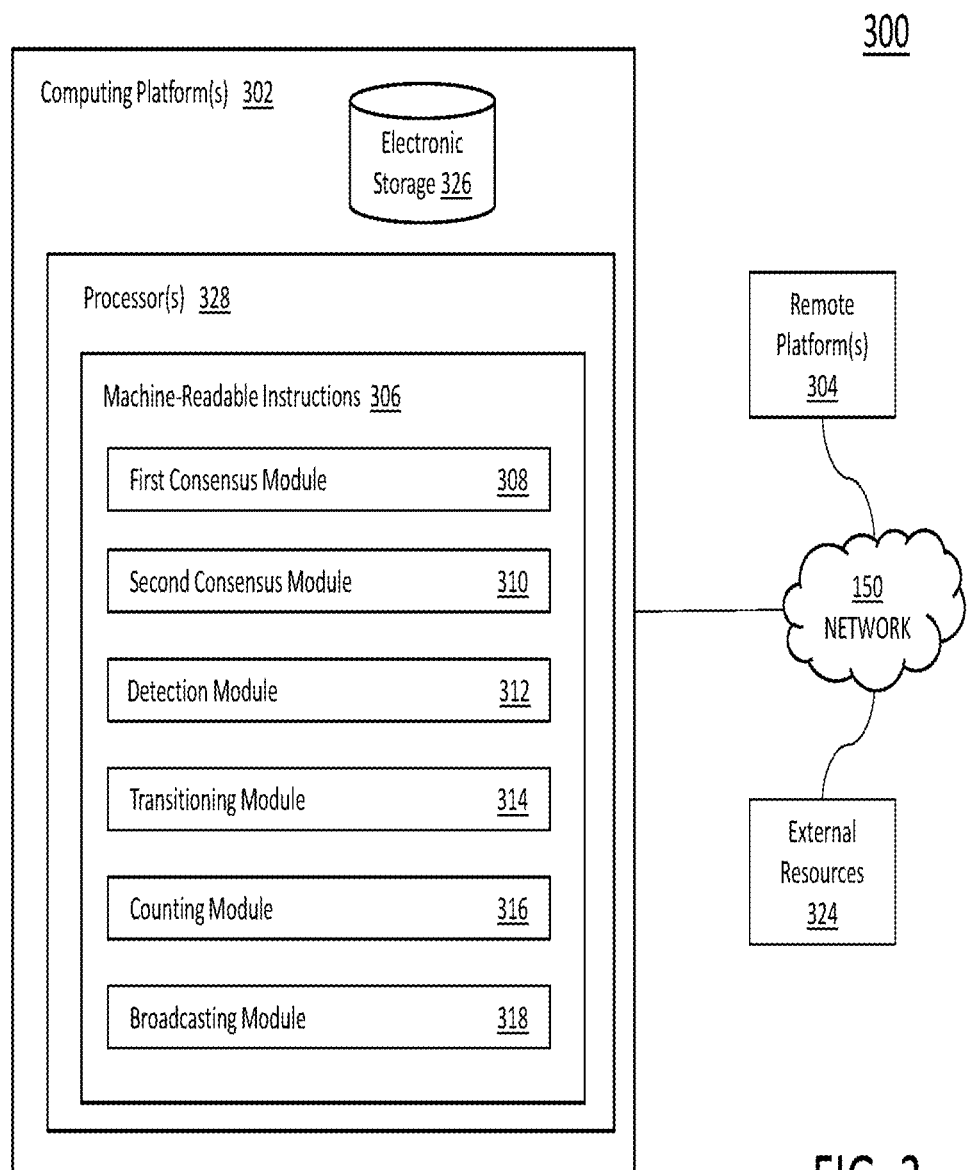
FIG. 3 illustrates a system configured for processing a transition protocol, according to certain aspects of the present disclosure.

FIG. 3 illustrates a system 300 configured for processing consensus protocols using a transition protocol to enhance liveness in the system, in accordance with one or more implementations. Consensus protocols validate values in order to add new blocks to a blockchain network while ensuring that all nodes in the blockchain network agree on the addition of the new block. The transition protocol may continuously loop transitioning between a first consensus protocol and a second consensus protocol in order to enhance liveness of the first consensus protocol, each node running through a sequence of first and second operating modes. By non-limiting example, the transition protocol may enable transitioning from a fast-safe consensus instance to a second slower (with reference to the first) consensus instance with high safety-high liveness. According to embodiments, each (honest) node in the set of nodes may manage its own blockchain replica and participate in the first consensus protocol or second consensus protocol.

In some implementations, system 300 includes one or more computing platforms 302. Computing platform(s) 302 can be configured to communicate with one or more remote platforms 304 according to a client/server architecture, a peer-to-peer architecture, and/or other architectures. Remote platform(s) 304 can be configured to communicate with other remote platforms via computing platform(s) 302 and/or according to a client/server architecture, a peer-to-peer architecture, and/or other architectures. Users can access system 300 via remote platform(s) 304. The computing platform(s) 302, external resources 324, and remote platform(s) 304 may be in communication and/or mutually accessible via the network 150.

Computing platform(s) 302 can be configured by machine-readable instructions 306. Machine-readable instructions 306 includes one or more instruction modules. The instruction modules include computer program modules. The instruction modules include one or more of first consensus module 308, second consensus module 310, detection module 312, transitioning module 314, counting module 316, broadcasting module 318, and/or other instruction modules.

The first consensus module 308 can be configured to run a first operating mode. In the first operating mode, a first consensus protocol is running in a set of nodes until a liveness attack is detected. Running the first consensus protocol may include querying the set of nodes for a value. A block is accepted in the first consensus protocol if and only if a decided chain of the protocol decided chain contains the block. The first consensus protocol may be a consensus protocol with high safety guarantees. According to embodiments, all nodes have a preferred block $B_{pref}$. When a node reports a preferred block, the preferred block has been validated by the node. A block is preferred in the first consensus protocol if a preferred chain of the protocol contains the block. Preferred block IDs of the nodes may be broadcasted to all nodes in the blockchain network.

The second consensus module 310 can be configured to run a second operating mode. In the second operating mode, a second consensus protocol is running in the set of nodes until the protocol decides on a new value (i.e., new accepted block $B_a^{BS}$). Running the second consensus protocol may include querying the set of nodes for at least one value in accordance with the second consensus protocol. The second consensus protocol may be a consensus protocol with, for example, high safety and high liveness guarantees. The second consensus protocol may only be triggered as a fallback option (e.g., when high liveness is needed) to finalize blocks in the blockchain network. The accepted block $B_a^{BS}$ decided by running the second consensus protocol corresponds to an accepted block. Each accepted block $B_a^{BS}$ represents a successful transition.

The detection module 312 can be configured to perform liveness failure detection. The liveness failure detection includes determining when the first consensus protocol is no longer making progress (i.e., liveness is lost) and initiates a transition protocol. For example, when the detection module 312 determines the first consensus protocol encounters a liveness attack at node u, the first consensus module 308 freezes all acceptance of new blocks in any other members in the set of nodes.

The transitioning module 314 is configured to switch the operating modes. According to embodiments, when the detection module 312 determines the first consensus protocol encounters a liveness attack, the transitioning module 314 switches the system 300 from the first operating mode to the second operating mode. According to embodiments, when the operating mode is switched, the second consensus module 310 runs a single shot second consensus protocol until a consensus is decided on accepted block $B_a^{BS}$. The transitioning module 314 may be further configured to ensure that every honest node runs the second consensus protocol once the transition protocol is initiated.

The counting module 316 is configured to maintain an instance counter for tracking instances of the transition protocol (i.e., transitioning from running the first consensus protocol to the second consensus protocol). The instance counter may be monotonically increased from zero. According to embodiments, a node u increments its instance counter u.id when the second consensus module 310 decides on a new accepted block $B^{SD}$, completing an instance id of the transition protocol. As such, each accepted block represents a successful transition. Each accepted block on the chain can be identified by the instance counter. If a current instance counter u.id is increased, any ongoing transition instances of a previous instance (i.e., id−1) stops and accepts all blocks up to the most recently accepted block from the run (inclusive of the most recently accepted block).

According to embodiments, when the second consensus module 310 is complete (i.e., the second consensus protocol makes a decision), the current instance (i.e., u.id=id−1) of the transition protocol is marked complete. According to some embodiments, a complete message is broadcasted when a consensus is decided (e.g., accepted block $B_a^{BS}$) with a quorum certificate (e.g., $QC(B_a^{BS})$) as a proof and an instance is marked complete. Complete messages may be tagged by the corresponding instance id (e.g., $\langle$ complete, id, $QC(B_a^{BS})\rangle$). The complete message may be used to certify the acceptance of a new block $B_a^{BS}$. Certifying the acceptance enables, for example, honest nodes that fall behind to catch up with the progress safely and quickly. This ensures the liveness of repeated second protocol instantiations in the presence of asynchrony (or even some message loss). In some implantations, nodes may be running a prior instance of the second consensus protocol. The unique instance id, which is associated with all messages, avoids errors in the system which may occur due to asynchrony.

In some embodiments, nodes keep a flag to represent whether an instance of the second consensus protocol is running and the last completed instance id (i.e., u.id).

The broadcasting module 318 is configured to, after the first consensus module 308 stops answering queries, broadcast the preferred block $B_{pref}$ for the current instance id. By non-limiting example, the preferred block $B_{pref}$ is broadcast to all nodes (e.g., the set of nodes) across the blockchain network (e.g., by $\langle$prefer, id, $B_{pref}\rangle$). The broadcasting module 318 may be further configured to wait for a preset number of broadcast messages of the preferred block $B_{pref}$ from all the other nodes in the network. The present number may represent a stake percentage of nodes running the first consensus protocol. Once the preset number of broadcast messages is met, an initial proposal for the second consensus protocol is set to the accepted block $B^{SD}$ that received the preset number of transitive preferences.

According to embodiments, the accepted block $B^{SD}$ may be the highest accepted block from the first consensus protocol and is determined based on the preferred block $B_{pref}$. The accepted block $B^{SD}$ is used as the initial proposal block for the second consensus protocol. By non-limiting example, the accepted block $B^{SD}$ is set to be equal to an initial block $B_0$ (i.e., $B^{SD}:=B_0$) of the current instance id. The initial block $B_0$ is a first block upon which additional blocks in a blockchain are added. As such, initial block $B_0$ defines the initial preference used to seed proposals in the consensus protocol. This will guarantee that all nodes that are following the transition protocol (i.e., running the second consensus protocol in a current instance id) have an initial preference that does not conflict with any accepted blocks in the preceding first consensus protocol instance. In some embodiments, to ensure that the second consensus protocol running in the current instance id makes useful progress, a new child block of accepted block $B^{SD}$ is bundled as the new proposal block of the current instance id.

According to embodiments, when the second consensus protocol decides on the accepted block Bas, the broadcasting module 318 is configured to broadcast the complete message to the network wherein the node u is also a recipient of the complete message. In some embodiments, the node u sending the complete message to itself triggers the instance counter to increment (i.e., u.id←id+1). Broadcasting the complete message may also trigger the transitioning module 314 to switch the operating mode back to the first operating mode for new blocks. As such, the first consensus module 308 reinstates the first consensus protocol. Reinstatement of the first consensus protocol indicates the completion of a full cycle of the transition protocol.

According to embodiments, because complete messages are tagged by an instance id, past instances (i.e., ≤u.id) can be ignored in current transition protocol instances. Further, future messages (i.e., id"≤u.id+1) do not need to buffer because, for example, node u must have already received a complete message (e.g., ⟨complete, id"−1,*⟩), and thus instance counter u.id has already been bumped up.

In some implementations, computing platform(s) 302, remote platform(s) 304, and/or external resources 324 can be operatively linked via one or more electronic communication links. For example, such electronic communication links can be established, at least in part, via a network such as the Internet and/or other networks. It will be appreciated that this is not intended to be limiting, and that the scope of this disclosure includes implementations in which computing platform(s) 302, remote platform(s) 304, and/or external resources 324 can be operatively linked via some other communication media.

A given remote platform 304 includes one or more processors configured to execute computer program modules. The computer program modules can be configured to enable an expert or user associated with the given remote platform 304 to interface with system 300 and/or external resources 324, and/or provide other functionality attributed herein to remote platform(s) 304. By way of non-limiting example, a given remote platform 304 and/or a given computing platform 302 includes one or more of a server, a desktop computer, a laptop computer, a handheld computer, a tablet computing platform, a NetBook, a Smartphone, a gaming console, and/or other computing platforms.

External resources 324 includes sources of information outside of system 300, external entities participating with system 300, and/or other resources. In some implementations, some or all of the functionality attributed herein to external resources 324 can be provided by resources included in system 300.

Computing platform(s) 302 include(s) electronic storage 326, one or more processors 328, and/or other components. Computing platform(s) 302 include(s) communication lines, or ports to enable the exchange of information with a network and/or other computing platforms. Illustration of computing platform(s) 302 is not intended to be limiting. Computing platform(s) 302 include(s) a plurality of hardware, software, and/or firmware components operating together to provide the functionality attributed herein to computing platform(s) 302. For example, computing platform(s) 302 can be implemented by a cloud of computing platforms operating together as computing platform(s) 302.

Electronic storage 326 can include non-transitory storage media that electronically stores information. The electronic storage media of electronic storage 326 includes one or both of system storage that is provided integrally (e.g., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 326 includes one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 326 includes one or more virtual storage resources (e.g., cloud storage, a virtual private network, and/or other virtual storage resources). Electronic storage 326 can store software algorithms, information determined by processor(s) 328, information received from computing platform(s) 302, information received from remote platform(s) 304, and/or other information that enables computing platform(s) 302 to function as described herein.

Processor(s) 328 can be configured to provide information processing capabilities in computing platform(s) 302. As such, processor(s) 328 includes one or more of a digital processor, an analog processor, a digital circuit designed to process information, an analog circuit designed to process information, a state machine, and/or other mechanisms for electronically processing information. Although processor(s) 328 is shown as a single entity, this is for illustrative purposes only. In some implementations, processor(s) 328 includes a plurality of processing units. These processing units can be physically located within the same device, or processor(s) 328 can represent processing functionality of a plurality of devices operating in coordination. Processor(s) 328 can be configured to execute modules 308, 310, 312, 314, 316, and/or 318, and/or other modules. Processor(s) 328 can be configured to execute modules 308, 310, 312, 314, 316, and/or 318, and/or other modules by software, hardware, firmware, some combination of software, hardware, and/or firmware, and/or other mechanisms for configuring processing capabilities on processor(s) 328. As used herein, the term "module" can refer to any component or set of components that perform the functionality attributed to the module. This includes one or more physical processors during execution of processor readable instructions, the processor readable instructions, circuitry, hardware, storage media, or any other components.

It should be appreciated that although modules 308, 310, 312, 314, 316, and/or 318 are illustrated as being implemented within a single processing unit, in implementations in which processor(s) 328 includes multiple processing units, one or more of modules 308, 310, 312, 314, 316, and/or 318 can be implemented remotely from the other modules. The description of the functionality provided by the different modules 308, 310, 312, 314, 316, and/or 318 described below is for illustrative purposes, and is not intended to be limiting, as any of modules 308, 310, 312, 314, 316, and/or 318 can provide more or less functionality than is described. For example, one or more of modules 308, 310, 312, 314, 316, and/or 318 can be eliminated, and some or all of its functionality can be provided by other ones of modules 308, 310, 312, 314, 316, and/or 318. As another example, processor(s) 328 can be configured to execute one or more additional modules that can perform some or all of the functionality attributed below to one of modules 308, 310, 312, 314, 316, and/or 318.

The techniques described herein can be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
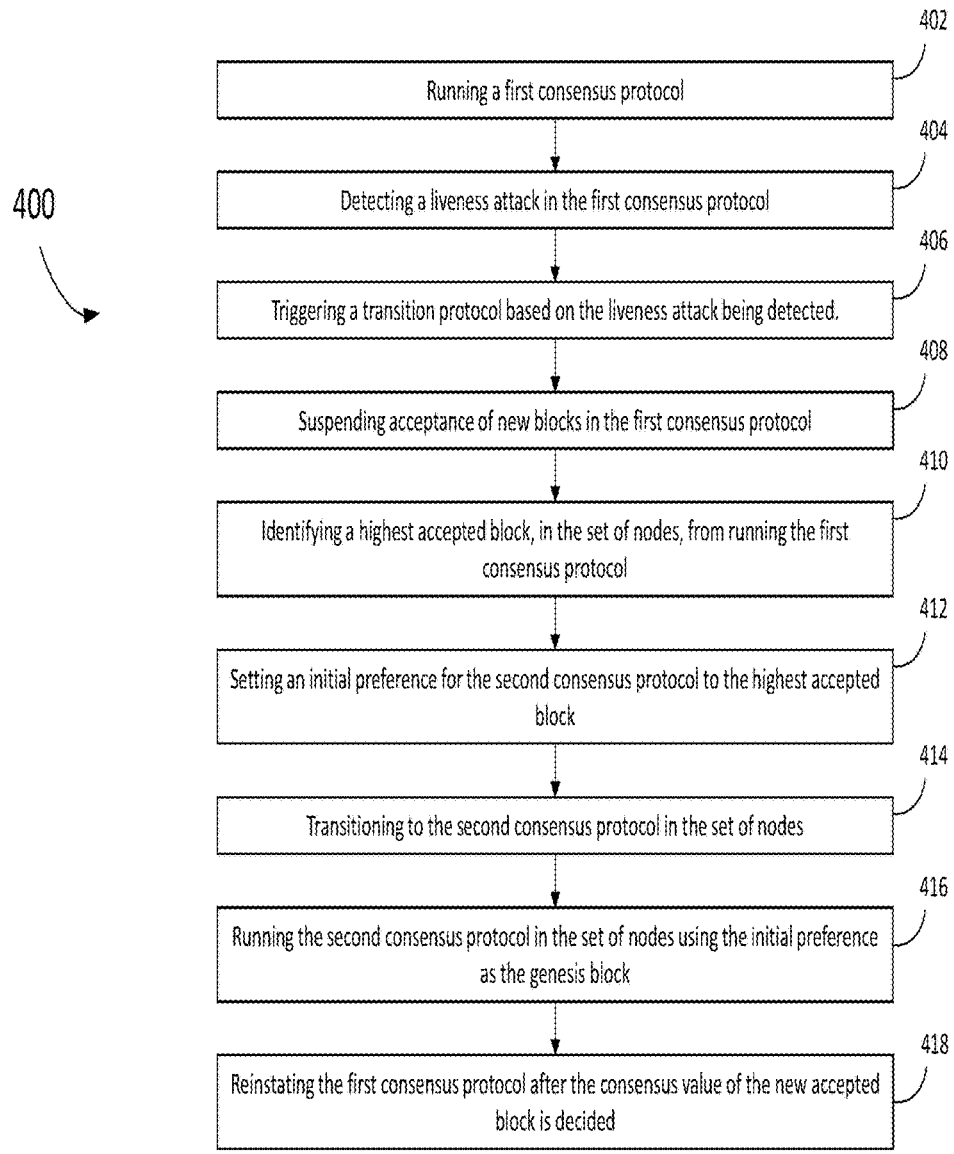
FIG. 4 is an example flow diagram for enhancing liveness in consensus protocols, according to certain aspects of the present disclosure.

FIG. 4 illustrates an example flow diagram (e.g., process 400) for enhancing liveness in consensus protocols using a transition mechanism, according to certain aspects of the disclosure. For explanatory purposes, the steps of the example process 400 are described herein as occurring in serial, or linearly. However, multiple instances of the example process 400 may occur in parallel, overlapping in time, almost simultaneously, or in a different order from the order illustrated in the process 400. In addition, the blocks of the example process 400 need not be performed in the order shown and/or one or more of the blocks of the example process 400 need not be performed.

At step 402, the process 400 includes running a first consensus protocol in a set of nodes of a blockchain network. The first consensus protocol may be a protocol that guarantees high safety such that if a node agrees on a value, no other node in the network will agree on a conflicting value. According to embodiments, running the first consensus protocol includes polling the set of nodes for values of new blocks. At step 404, the process 400 includes detecting a liveness attack in the first consensus protocol at a node in the set of nodes. By non-limiting example, liveness attacks include when the first consensus protocol does not result in agreeing on a value fast enough. As such, the liveness attack is characterized by the first consensus protocol no longer making progress.

At step 406, the process 400 includes triggering a transition protocol based on the liveness attack being detected. The transition protocol enables the consensus processing to transition from the first consensus protocol to a second consensus protocol. According to embodiments, the second consensus protocol may be a protocol that guarantees high safety and high liveness. The second consensus protocol may be a protocol that is slower relative to the first consensus protocol.

At step 408, the process 400 includes suspending, when the transition protocol is initiated, acceptance of new blocks in the first consensus protocol. Suspending acceptance may include stopping all polling (or querying) the set of nodes. When the polling stops, the process 400 may include broadcasting a preferred block of the set of nodes to the blockchain network.

At step 410, the process 400 includes identifying a highest accepted block, in the set of nodes, from running the first consensus protocol. The preferred block may be used to determine a highest accepted block based on running the first consensus protocol.

At step 412, the process 400 includes setting an initial preference for the second consensus protocol to the highest accepted block. The initial preference will be used to seed proposals of the second consensus protocol. In some embodiments, the process 400 waits for a present number of broadcast messages comprising the preferred block from the set of nodes and sets the initial preference for running the second consensus when the preset number is met.

At step 414, the process 400 includes transitioning from the first consensus protocol to the second consensus protocol.

At step 416, the process 400 includes running the second consensus protocol in the set of nodes using the initial preference as the initial block (i.e., block 0). At step 418, the process 400 includes deciding on a consensus value of a new accepted block (i.e., a finalized block). According to embodiments, the second consensus protocol will run until the decision is made for the new accepted block. According to embodiments, the new accepted block may represent a successful completion of a protocol transition. In some embodiments, the process 400 includes generating, based on the new accepted block, a complete message including a transition instance ID and broadcasting the complete message to the blockchain network. According to some embodiments, the process 400 includes maintaining, at the set of nodes, a flag representing whether the second consensus protocol is running. The flag may also include a last completed transition instance ID.

According to embodiments, the process 400 may include incrementing a transition instance counter based on the second consensus protocol deciding on the new accepted block. In some embodiments, the transition instance counter is incremented after the complete message is broadcasted. The transition instance counter may track each transition from the first consensus protocol to the second consensus protocol in the blockchain network. As such, a value of the transition instance counter may represent a number of past accepted blocks as an identifier of the transition instance.

According to embodiments, the process 400 may include determining, based on the new accepted block, a staking set included in a shared chain block of the blockchain network using a height field included in the new accepted block, wherein the height field points to the shared chain block.

At step 418, the process 400 includes reinstating the first consensus protocol after the consensus value of the new accepted block is decided. The first consensus protocol resumes on top of the new accepted block. Step 418 completes a full cycle of the transition mechanism.

The techniques described herein (for example, process 400) may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

In some implementations, one or more operation blocks of FIG. 4 may be performed by a processor circuit executing instructions stored in a memory circuit, in a client device, a remote server or a database, communicatively coupled through a network (e.g., processors 328, memories described in FIG. 1, participant 110, participant 130, database 152, and network 150).

Although FIG. 4 shows example blocks of the process 400, in some implementations, the process 400 may include additional blocks, fewer blocks, different blocks, or differently arranged blocks than those depicted in FIG. 4.

Hardware Overview

Figure 5:
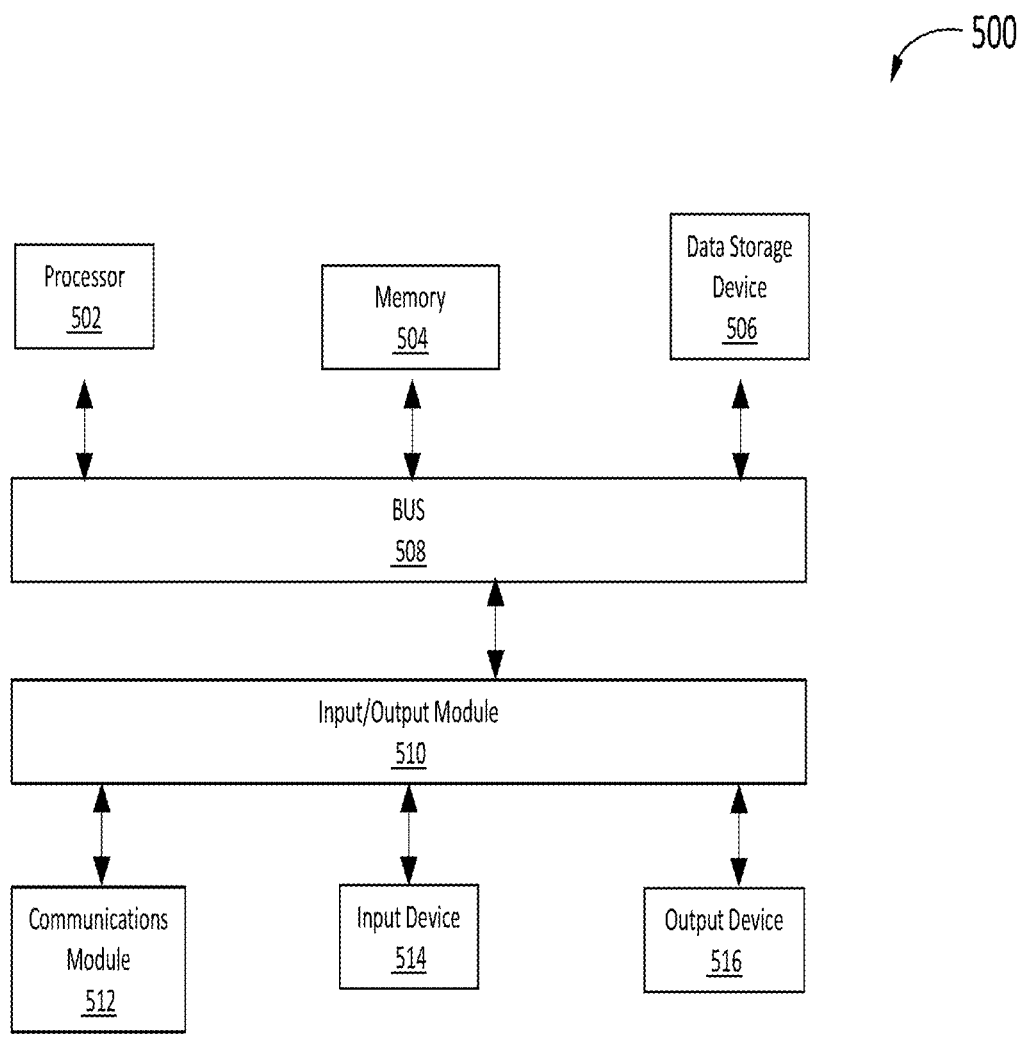
FIG. 5 is a block diagram illustrating an example computer system with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

The computer system 500 (e.g., server and/or participant) includes a bus 508 or other communication mechanism for communicating information, and a processor 502 coupled with the bus 508 for processing information. By way of example, the computer system 500 may be implemented with one or more processors 502. Each of the one or more processors 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. Processor 502 and memory 504 can be supplemented by, or incorporated in, special purpose logic circuitry.

The instructions may be stored in memory 504 and implemented in one or more computer program products, i.e., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by the processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 500 further includes a data storage device 506 such as a magnetic disk or optical disk, coupled to bus 508 for storing information and instructions. The computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described systems can be implemented using a computer system 500 in response to the processor 502 executing one or more sequences of one or more instructions contained in the memory 504. Such instructions may be read into memory 504 from another machine-readable medium, such as data storage device 506. Execution of the sequences of instructions contained in the main memory 504 causes the processor 502 to perform the process steps described herein. One or more processors in a multi-processing arrangement may also be employed to execute the sequences of instructions contained in the memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 500 can include clients and servers. A client and server are generally remote from each other and typically interact through a communication network. The relationship of client and server arises by virtue of computer programs running on the respective computers and having a client-server relationship to each other. The computer system 500 can be, for example, and without limitation, a desktop computer, laptop computer, or tablet computer. The computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 502 for execution. Such a medium may take many forms, including, but not limited to, non-volatile media, volatile media, and transmission media. Non-volatile media include, for example, optical or magnetic disks, such as the data storage device 506. Volatile media include dynamic memory, such as the memory 504. Transmission media include coaxial cables, copper wire, and fiber optics, including the wires that comprise the bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A computer-implemented method for implementing transition protocols, comprising:
   detecting a lack of liveness in a first consensus protocol at a node in a blockchain network;
   suspending, when the lack of liveness is detected, acceptance of new blocks and a polling across nodes participating in the first consensus protocol and freezing a state of each node's consensus instance;
   initiating a transition protocol implementing a transition from the first consensus protocol to a second consensus protocol, wherein the frozen state of each node's consensus instance is used to seed the second consensus protocol;
   running the second consensus protocol configured to finalize a new block representing a successful protocol transition;
   generating, based on the new block, a complete message, wherein the complete message is tagged by a transition instance identification (ID);
   broadcasting the complete message signed by a quorum of nodes to the blockchain network, wherein the node receiving the complete message triggers an instance counter to increment; and
   restarting the first consensus protocol with the new accepted block.

2. The computer-implemented method of claim 1, further comprising reinstating the first consensus protocol after a consensus value of the new accepted block is finalized by running the second consensus protocol, wherein the first consensus protocol is reinstated on top of the new accepted block.

3. The computer-implemented method of claim 1, wherein the first consensus protocol is a fast protocol that guarantees high safety, and the second consensus protocol is a protocol that guarantees high safety and high liveness.

4. The computer-implemented method of claim 1, further comprising:
   broadcasting, to the blockchain network, a preferred block of the set of nodes based on running the first consensus protocol, wherein the highest accepted block is determined based on the preferred block; and
   waiting for a present number of broadcast messages comprising the preferred block from the set of nodes, wherein the initial preference for running the second consensus is set based on the preset number of broadcast messages being met.

5. The computer-implemented method of claim 1, further comprising identifying the highest accepted block in the set of nodes from running the first consensus protocol.

6. The computer-implemented method of claim 1, further comprising monotonically incrementing a transition instance counter based on the second consensus protocol deciding on the new accepted block, wherein the transition instance counter tracks each transition from the first consensus protocol to the second consensus protocol in the blockchain network as a transition instance, and a value of the transition instance counter represents a number of past accepted blocks as an identifier of the transition instance.

7. The computer-implemented method of claim 1, wherein the second consensus protocol is a quorum-based asynchronous byzantine fault tolerance protocol.

8. The computer-implemented method of claim 1, further comprising maintaining, at the set of nodes, a flag representing whether the second consensus protocol is running, the flag including a last completed instance ID.

9. The computer-implemented method of claim 1, further comprising determining, based on the new accepted block, a staking set included in a shared chain block of the blockchain network using a height field included in the new accepted block, wherein the height field points to the shared chain block.

10. A system for implementing transition protocols, comprising:
    a processor; and
    a memory comprising instructions stored thereon, which when executed by the processor, causes the processor to:
      detect a lack of liveness in a first consensus protocol at a node in a blockchain network;
      suspend, when the lack of liveness is detected, acceptance of new blocks and a polling across nodes participating in the first consensus protocol and freezing a state of each node's consensus instance;
      initiate a transition protocol implementing a transition from the first consensus protocol to a second consensus protocol, wherein the frozen state of each node's consensus instance is used to seed the second consensus protocol;
      run the second consensus protocol configured to finalize a new block representing a successful protocol transition;
      generate, based on the new block, a complete message, wherein the complete message is tagged by a transition instance identification (ID);
      broadcast the complete message signed by a quorum of nodes to the blockchain network, wherein the node receiving the complete message triggers an instance counter to increment; and
      restart the first consensus protocol with the new accepted block.

11. The system of claim 10, further comprising instructions, which when executed by the processor, cause the processor to:
    reinstate the first consensus protocol after the consensus value of the new accepted block is determined, wherein the first consensus protocol is reinstated on top of the new accepted block.

12. The system of claim 10, wherein the first consensus protocol is a fast protocol that guarantees high safety, and the second consensus protocol is a protocol that guarantees high safety and high liveness.

13. The system of claim 10, further comprising instructions, which when executed by the processor, cause the processor to:
    broadcast, to the blockchain network, the preferred block of the set of nodes based on running the first consensus protocol, wherein the highest accepted block is determined based on the preferred block; and
    wait for a present number of broadcast messages comprising the preferred block from the set of nodes, wherein the initial preference for running the second consensus is set based on the preset number of broadcast messages being met.

14. The system of claim 10, further comprising instructions, which when executed by the processor, cause the processor to identify the highest accepted block in the set of nodes from running the first consensus protocol.

15. The system of claim 10, further comprising instructions, which when executed by the processor, cause the processor to:
    monotonically increment a transition instance counter based on the second consensus protocol deciding on the new accepted block, wherein the transition instance counter tracks each transition from the first consensus protocol to the second consensus protocol in the blockchain network, and a value of the transition instance counter represents a number of past accepted blocks as an identifier of the transition instance.

16. The system of claim 10, wherein the second consensus protocol is a quorum-based asynchronous byzantine fault tolerance protocol.

17. The system of claim 10, further comprising instructions, which when executed by the processor, cause the processor to:

maintain, at the set of nodes, a flag representing whether the second consensus protocol is running, the flag including a last completed instance ID.

18. A non-transitory computer-readable storage medium comprising instructions stored thereon, which when executed by one or more processors, cause the one or more processors to perform a method comprising:

detecting a lack of liveness in a first consensus protocol at a node in a blockchain network;

suspending, when the lack of liveness is detected, acceptance of new blocks and a polling across nodes participating in the first consensus protocol and freezing a state of each node's consensus instance;

initiating a transition protocol implementing a transition from the first consensus protocol to a second consensus protocol, wherein the frozen state of each node's consensus instance is used to seed the second consensus protocol;

running the second consensus protocol configured to finalize a new block representing a successful protocol transition;

generating, based on the new block, a complete message, wherein the complete message is tagged by a transition instance identification (ID);

broadcasting the complete message signed by a quorum of nodes to the blockchain network, wherein the node receiving the complete message triggers an instance counter to increment; and restarting the first consensus protocol with the new accepted block.

* * * * *